Nov. 16, 1971    O. D. COLVIN ET AL    3,619,987
DEVAPORIZING SYSTEMS

Filed Nov. 10, 1969    10 Sheets-Sheet 1

INVENTORS
OLIVER D. COLVIN
ROBERT A. TAYLOR
SAMUEL C. KELLY
BY Ward McClennon Brooks & Fitzpatrick
ATTORNEYS

INVENTORS
OLIVER D. COLVIN
ROBERT A. TAYLOR
SAMUEL C. KELLY
BY
ATTORNEYS

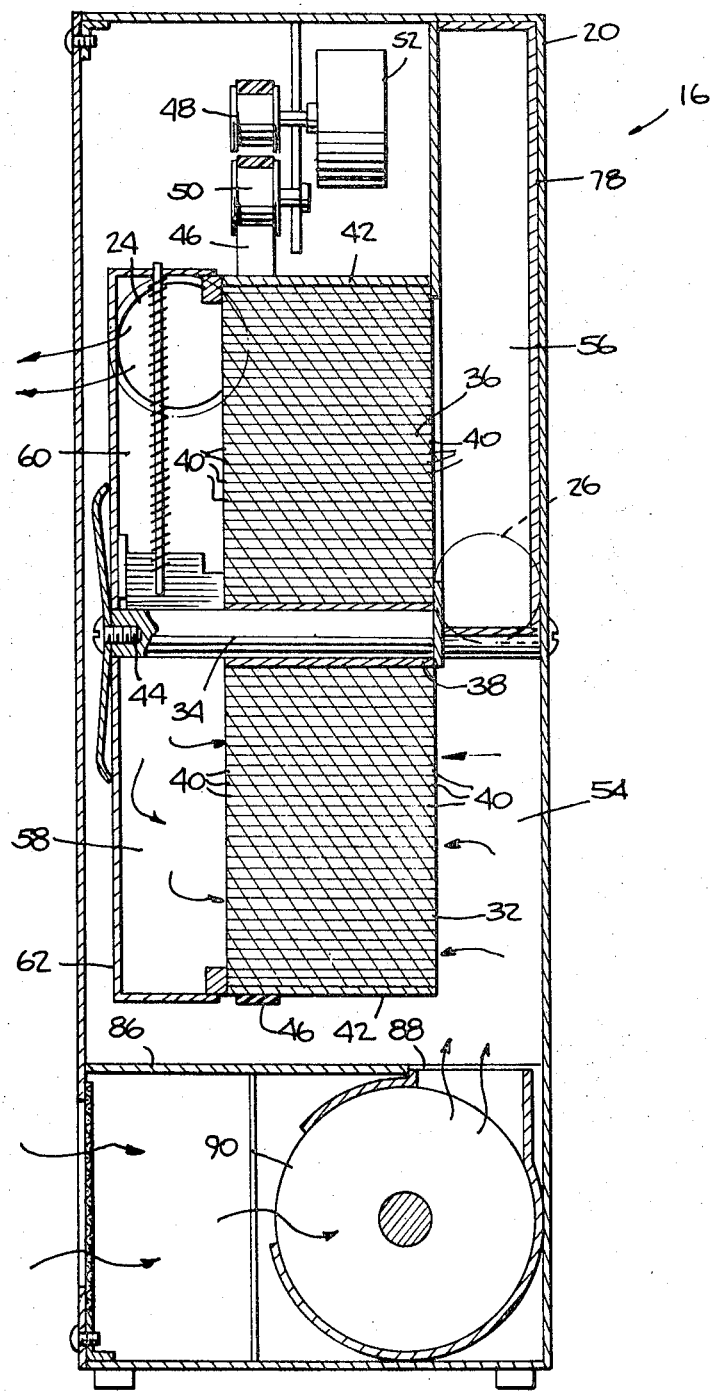

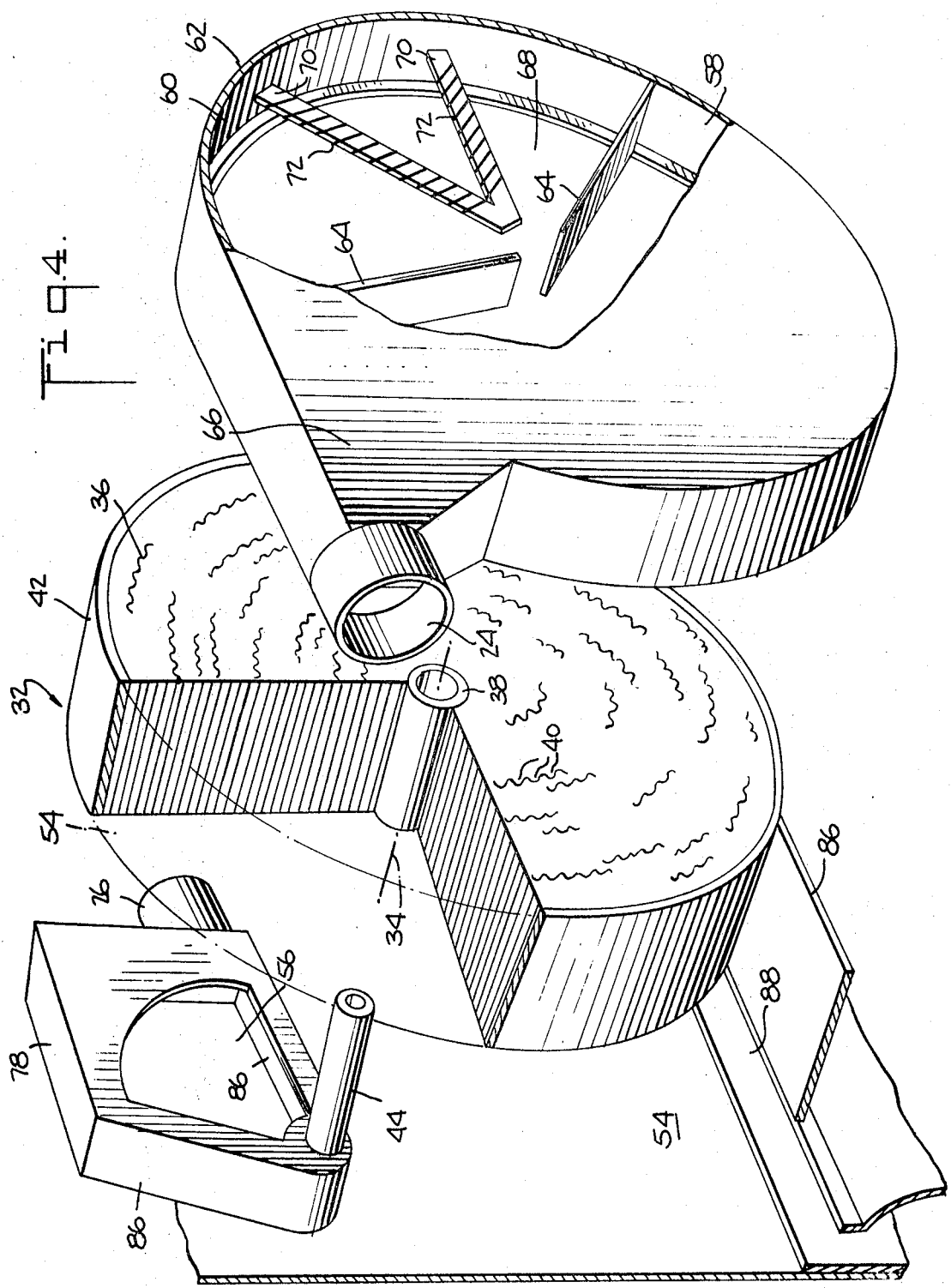

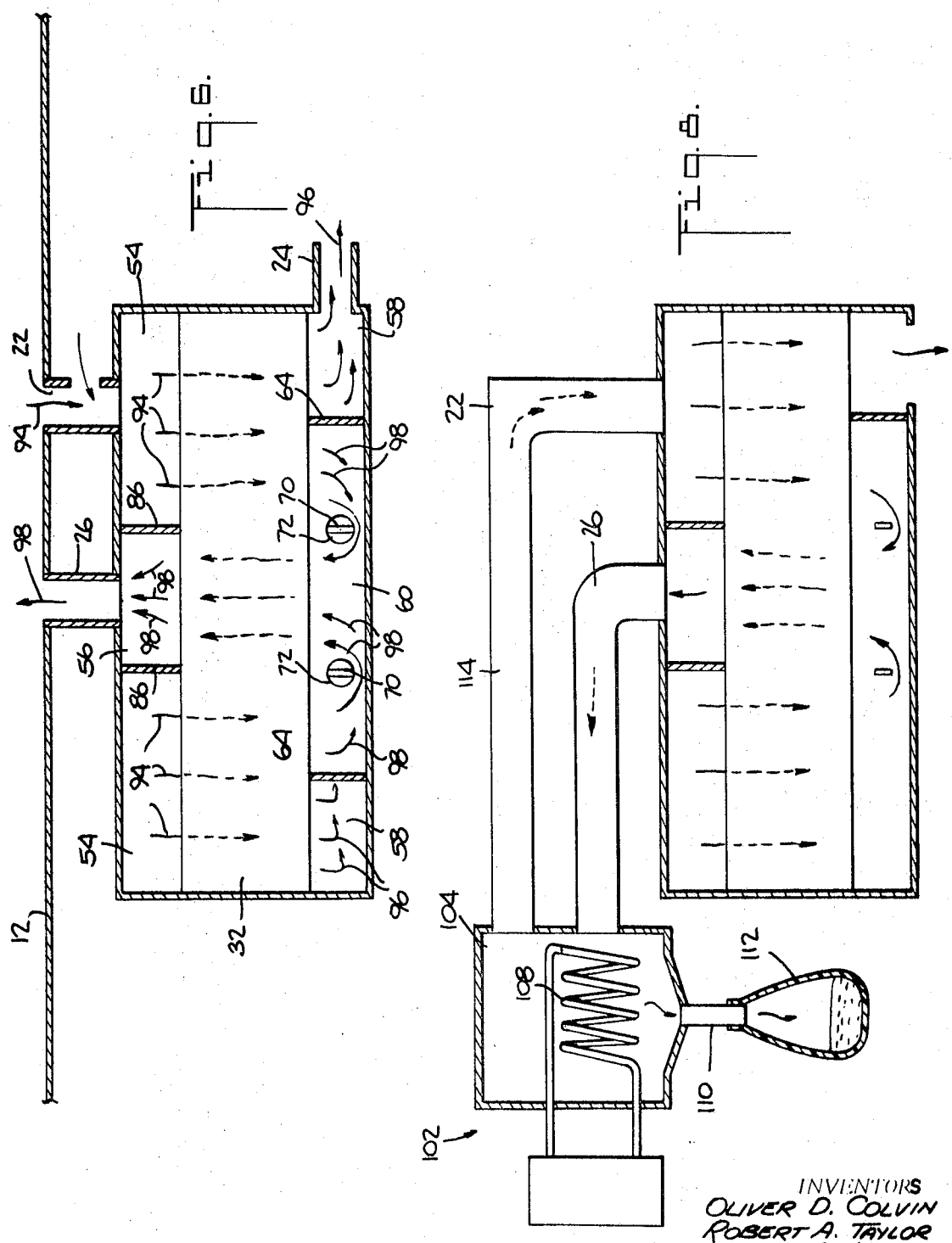

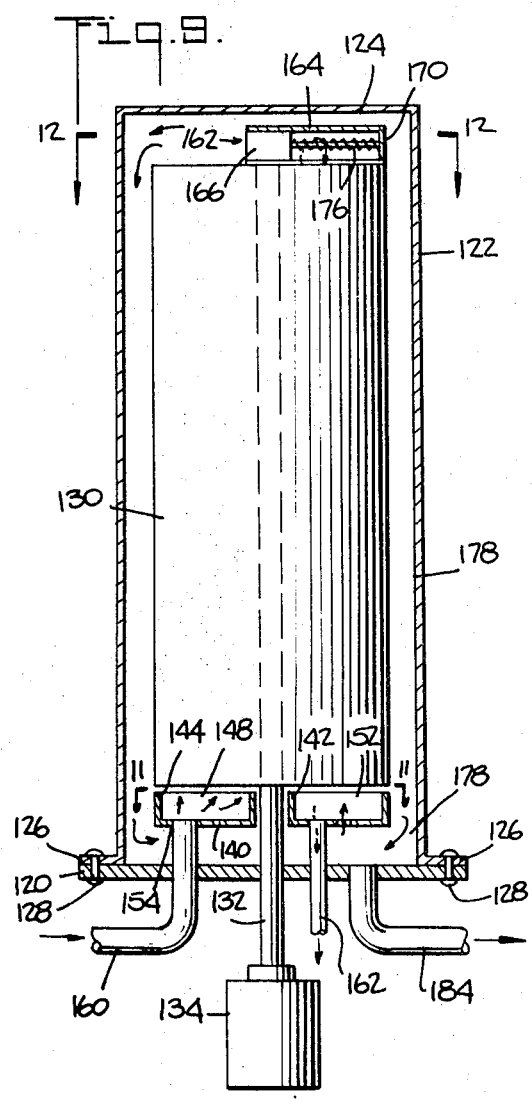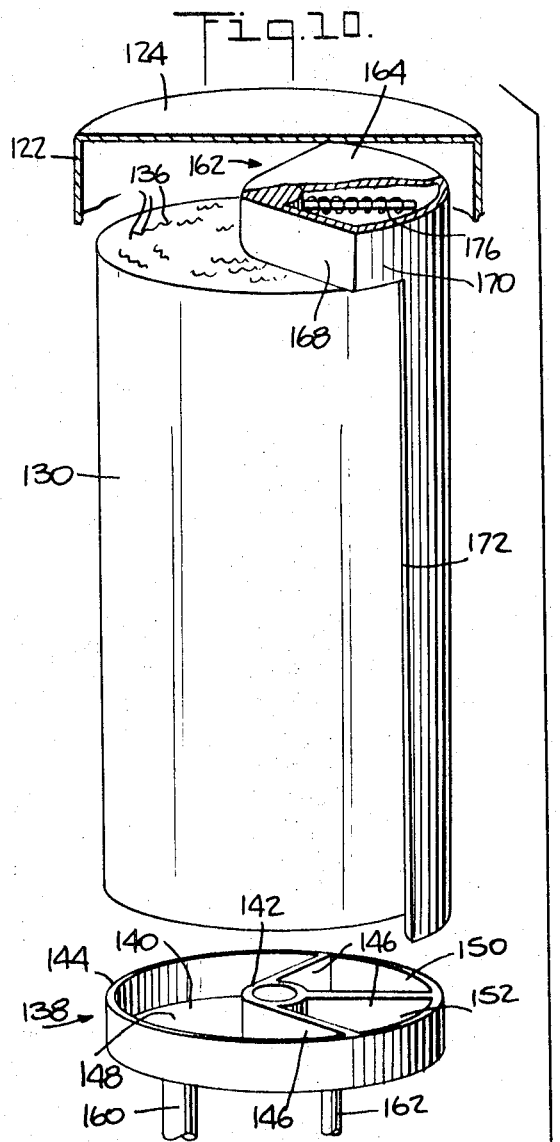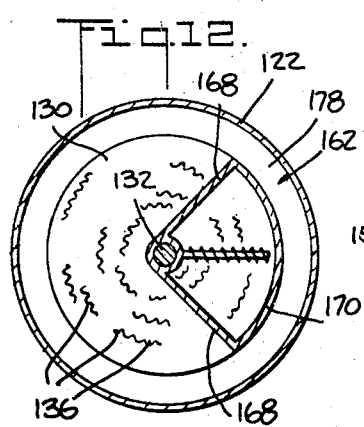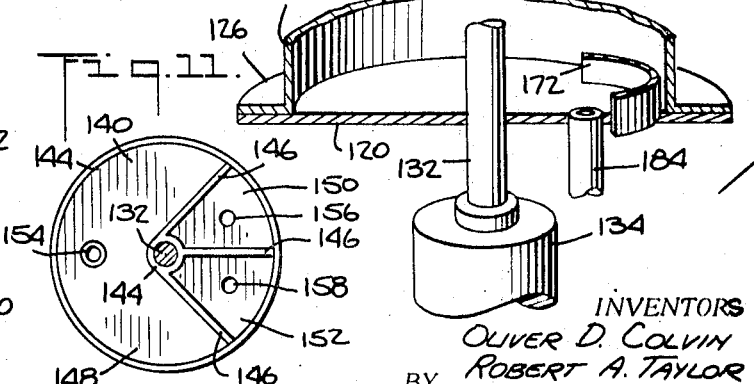
INVENTORS
OLIVER D. COLVIN
ROBERT A. TAYLOR
SAMUEL C. KELLY
BY
ATTORNEYS

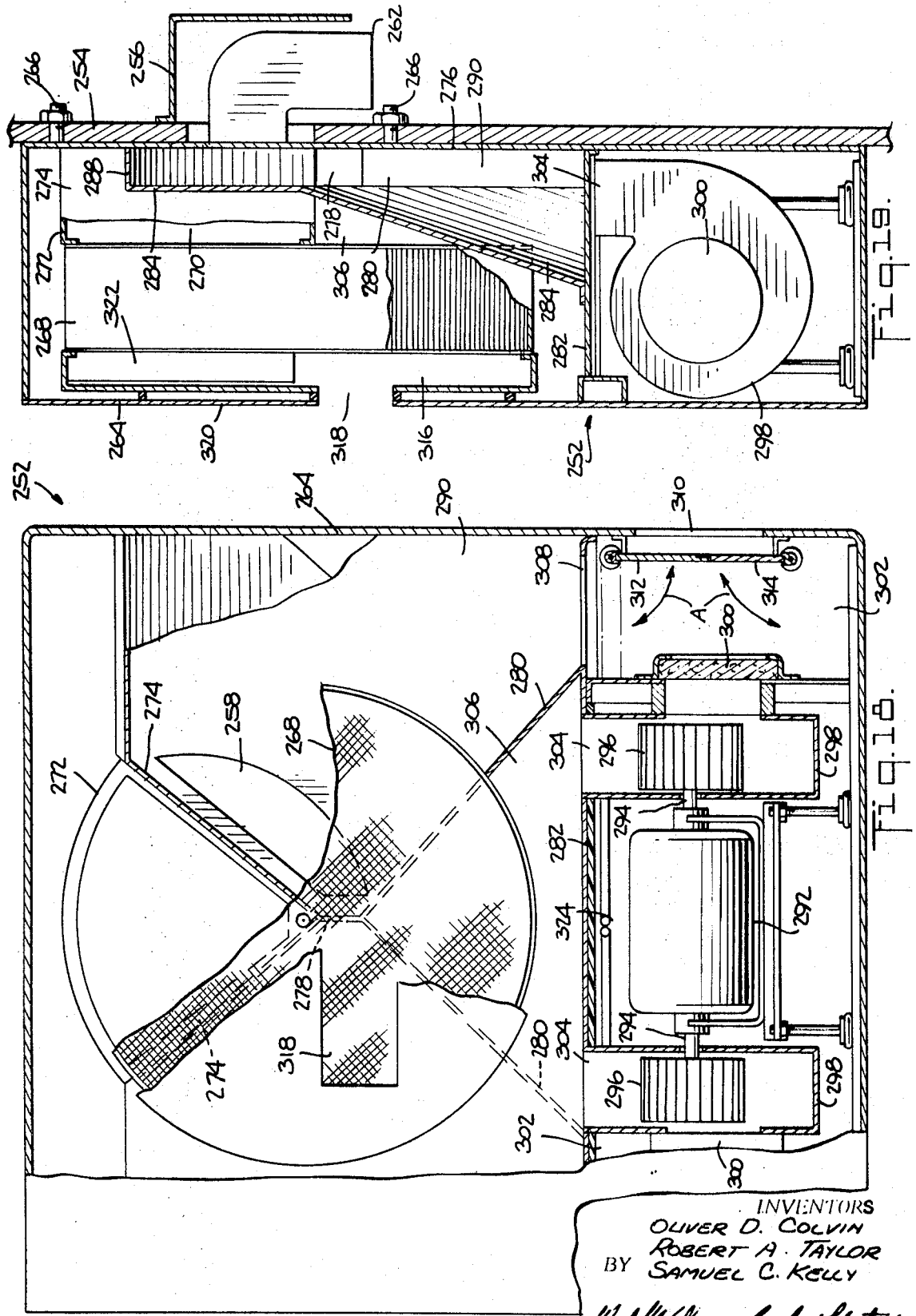

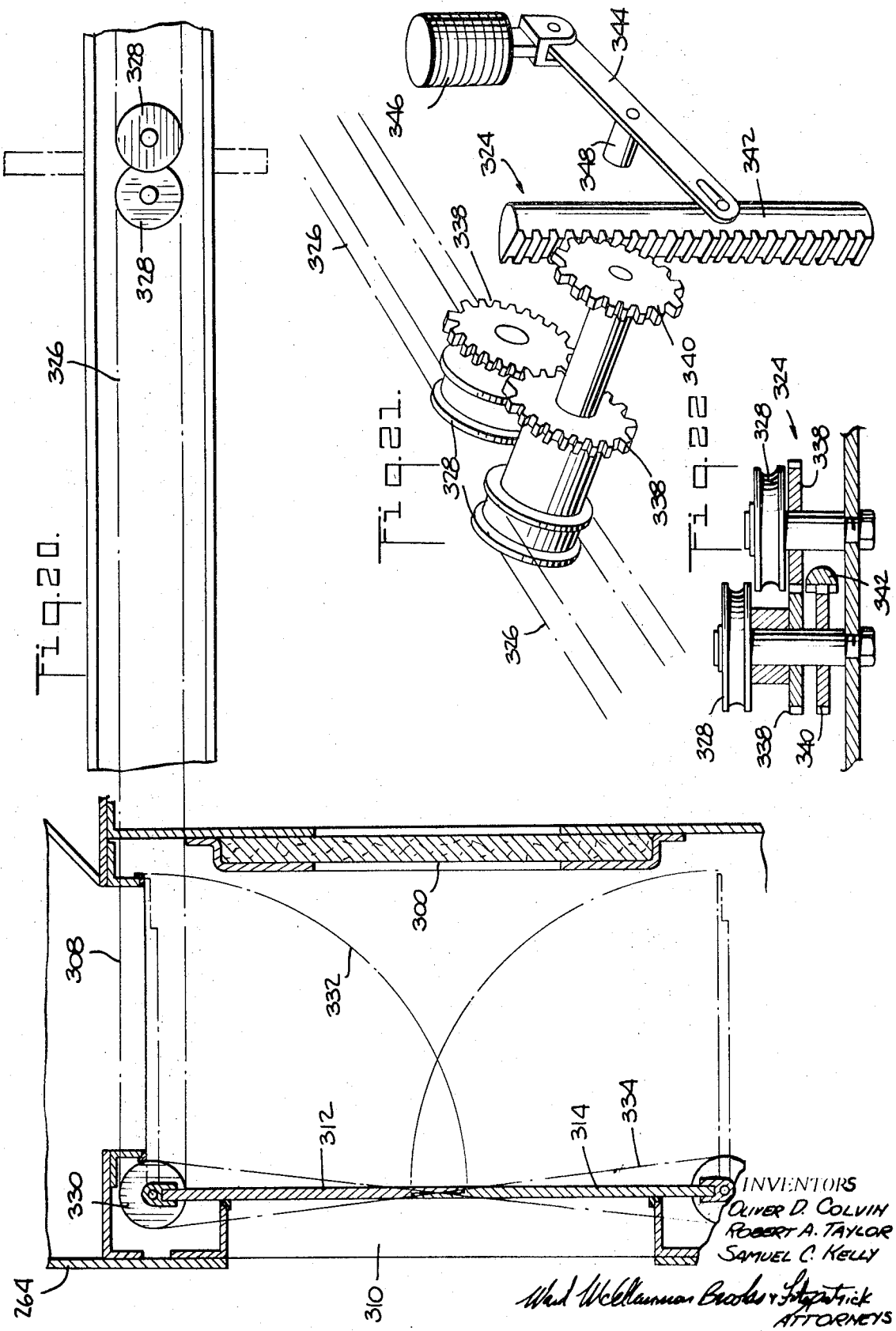

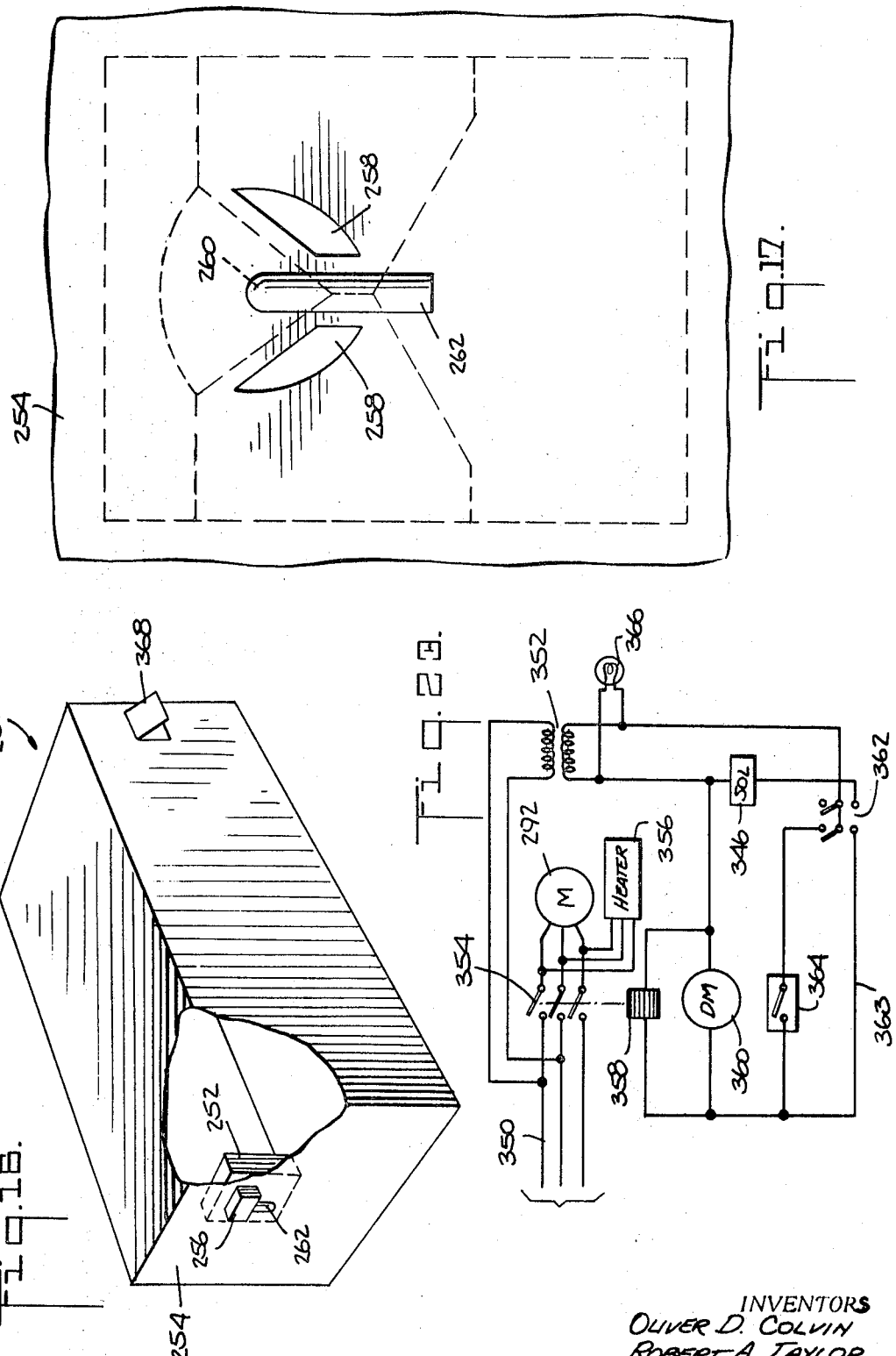

United States Patent Office 3,619,987
Patented Nov. 16, 1971

3,619,987
DEVAPORIZING SYSTEMS
Oliver D. Colvin, Hampton, N.H., Robert A. Taylor, Newburyport, Mass., and Samuel C. Kelly, Exeter, N.H., assignors to Oliver D. Colvin, Hampton, N.H.
Continuation-in-part of application Ser. No. 574,875, Aug. 5, 1966, now Patent No. 3,490,201. This application Nov. 10, 1969, Ser. No. 875,415
Int. Cl. B01d *19/00*
U.S. Cl. 55—196                                    21 Claims

ABSTRACT OF THE DISCLOSURE

Air dehumidifier systems for containerized cargo comprising a rotating wheel containing hygroscopic lined passageways and special internal ductwork, heating and cooling apparatus arranged to dry air from the container and simultaneously reactivate the wheel passageways.

---

This is a continuous-in-part of a copending application Ser. No. 574,875, filed Aug. 5, 1966, and now U.S. Pat. No. 3,490,201.

This invention relates to the devaporization of gases and more particularly it concerns an air drying device of the type which uses a hygrosopic substance.

The present invention is particularly useful in connection with the transportation of containerized cargo. Containerized cargo is put into standard sized containers at a point of origin; and it remains in these containers until it reaches its point of destination. The containers are designed to be carried by ship, by rail, by truck or by air; and when they are shifted from one mode of transportation to another there is no need to handle their contents or even to open them. Consequently, loading and unloading problems are minimized.

Because a cargo container generally remains closed throughout its journey and because the container is often subjected to rather severe changes in temperature during this time, there is often a possibility of condensate developing on the inside surfaces of the container and on the cargo itself. This possibility is increased where the cargo is of a moisture retaining nature, such as cocoa or coffee. In such case, the cargo itself will release moisture to the surrounding air within the container, and thereby raise the dewpoint temperature of the air.

In the past, various devices and techniques have been proposed in an effort to overcome the above described moisture problem. These devices and techniques have included opening the containers to fresh (and presumably drier) air. In some cases, fresh air was forcibly blown into the container.

All of these prior techniques have required either considerable effort, as where containers had to be individually opened and closed; or they required considerable complexity and expense, as where ducting and associated machinery was provided to blow air into the containers. Also, in the case of simply opening the container, the degree of dehumidification was often less than desired since circulation was poor and the ambient air could not be counted on to be much drier than the air in the container. In the case of forcible blowing of air into the individual containers, the necessary equipment was not readily adaptable to all modes of transportation.

Another technique employed in the past to control the humidity of cargoes in containers was the use of hygroscopic substances such as lithium chloride and the like. These materials would absorb moisture from the surrounding air thereby reducing the humidity within the container. This arrangement also was of limited utility because of the limited moisture absorbing capacity of the hygroscopic substance. Once the substance became saturated, it had to be treated and dried out before it could be used further. Since the replacement and treatment of hygroscopic substances in individual containers was an impractical operation on a carrier, the carrier in some cases was provided with a central system wherein air was dried by means of a hygroscopic substance at a central station and then was ducted to the individual containers. The hygroscopic substance was also treated at the central station so as to minimize difficulty and expense. While this system was effective on a given carrier, it lacked versatility since other carriers were, in many cases, not equipped with the necessary ducting and treatment machinery.

The present invention overcomes the above described problems of the prior art. According to the present invention, there is provided a hygroscopic type dehumidification system which is completely self contained with its own retreatment arrangement and yet which is small enough and inexpensive enough to be installed or positioned within an individual container and operated therein from conventional sources of electrical power.

According to one aspect of the present invention, there is provided a wheel containing a plurality of air flow passages extending through it parallel to the axis of the wheel. A housing is provided with air chambers which are open to the ends of the air flow passageways through the wheel. Walls are located within each of the air chambers and these walls divide each air chamber into separate major and minor regions, each open to the wheel air flow passageways at different sectors of rotation about the wheel axis. The minor region on one side of the wheel is larger than and encompasses the minor sector on the other side; and air heater means are provided within the larger minor sector. A fan is provided and blows air to be treated into the larger major region and through the portion of the wheel open to this region. The air which emerges from the other side of the wheel is directed by the wall system into the major and minor air chamber regions therein; and the air from the major region is blown out from the unit. The air which enters the larger minor region, however, becomes heated and redirected back through the portion of the wheel corresponding to the minor region on the opposite side. The heated air extracts moisture from this portion of the wheel thereby retreating it so that when this portion of the wheel later becomes realigned with the major air chamber regions, it will be effective to absorb further moisture from the air passing through it.

The heated air which has extracted moisture from the wheel may be discharged; or, as in a further aspect of the present invention, it may be cooled to liquify its moisture and thereafter it may be returned to the system and mixed with the incoming air.

According to this further aspect of the invention, there is provided a completely self-contained self-regenerating system needing no outside air or any connections outside the container, save for the electrical connections necessary, to energize the cooler, fan and wheel drive motors.

The present invention in a still further aspect provides novel gas flow arrangements whereby the portion of the fully dried gases which are to be used for reactivation purposes are caused to pass through that sector of the desiccant wheel just emerging from the heater region. This arrangement serves to cool the desiccant substance to a point where it becomes effective to perform a drying function. At the same time, the gases passing through this wheel sector become heated during their passage and thus require less heat from the heater to attain their reactivation temperature.

In yet another aspect, the present invention provides novel structural arrangements for desiccant wheel drying systems wherein stationary housings and plenum chambers of simple and economical construction can be used to provide relatively complex and diverse gas flow paths.

Various further and more specific objects, features and advantages of the invention will appear from the description given below, taken in connection with the accompanying drawings, illustrating by way of example preferred forms of the invention.

In the drawings:

FIG. 3 is a section view taken along lines 3—3 of FIG. 2;

FIG. 4 is a fragmentary perspective view of a wheel and wall arrangement forming a portion of the interior of the dehumidifying device of FIG. 1;

FIG. 5 is an exploded perspective view, partially cut away, of a portion of the dehumidifying device of FIG. 1;

FIG. 6 is a section view taken along lines 6—6 of FIG. 1;

FIG. 7 is an overall perspective view of a self-contained dehumidifying device forming a second embodiment of the present invention;

FIG. 8 is a diagrammatic view illustrating the airflow control arrangement utilized in the embodiment of FIG. 7;

FIG. 9 is an elevational section view of a gas drying system forming a further embodiment of the present invention;

FIG. 10 is an exploded perspective view, partially cut away, of the embodiment of FIG. 9;

FIG. 11 is a cross section view taken along line 11—11 of FIG. 9;

FIG. 12 is a cross section view taken along line 12—12 of FIG. 9;

FIG. 16 is a perspective view, partially cut away, of a cargo container provided with dehumidification according to the present invention;

FIG. 17 is an enlarged fragmentary view of one wall of the container of FIG. 16 showing dehumidification inlet and outlet arrangements;

FIG. 18 is an elevational section view partially cut away of a dehumidification unit used in the container of FIG. 16;

FIG. 19 is a section view taken along line 19—19 of FIG. 18;

FIG. 20 is an enlarged fragmentary section view, partially cut away, showing air flow control arrangements therein;

FIG. 21 is a fragmentary perspective view showing a drive mechanism for the air flow control arrangements of FIG. 20;

FIG. 22 is a fragmentary section view taken along line 21—21 of FIG. 21; and

FIG. 23 is a circuit diagram showing the electrical control arrangements used in the dehumidification unit of FIGS. 16–20.

Figure 1:
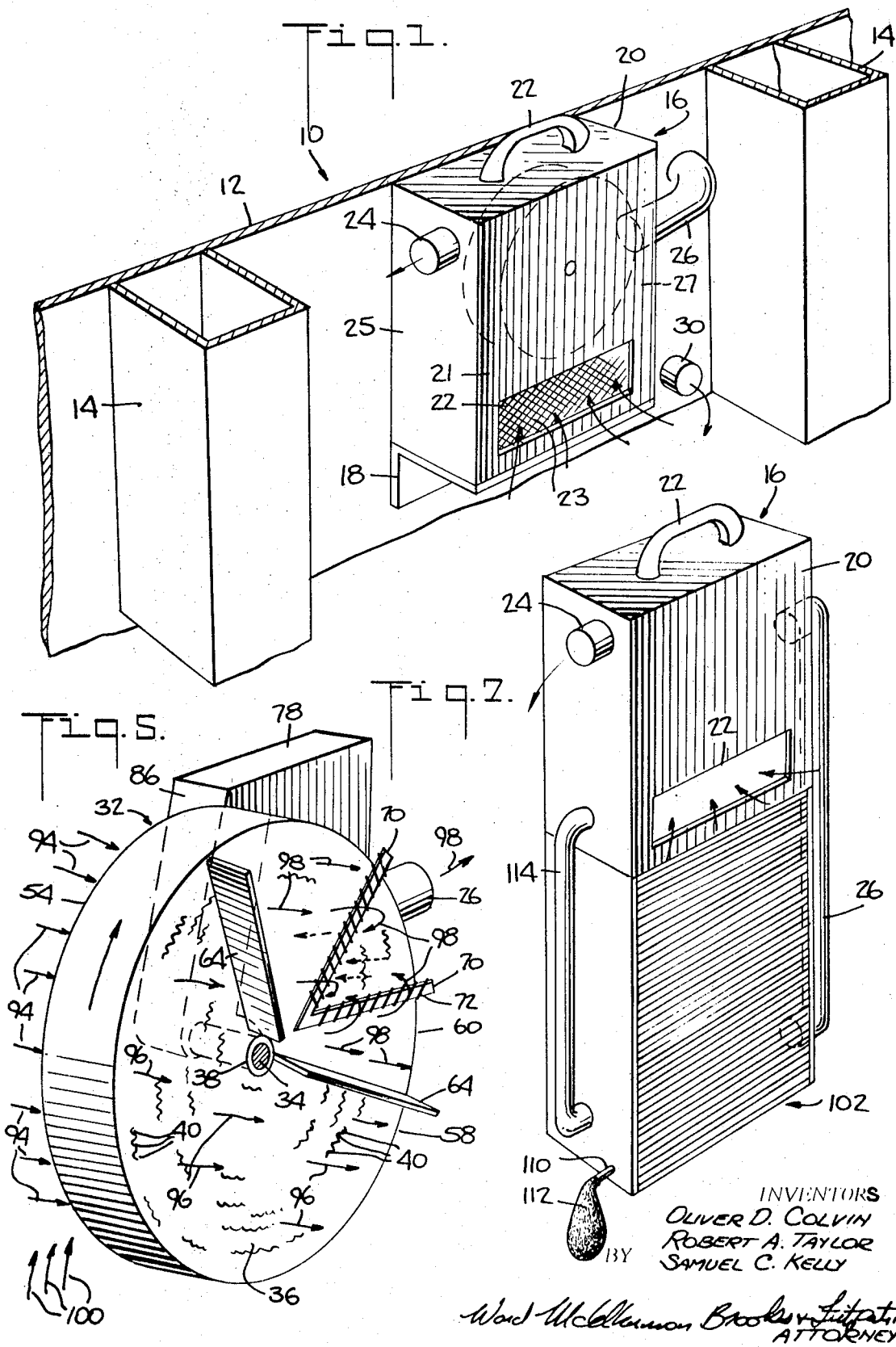
FIG. 1 is a fragmentary perspective view showing a portion of the interior of a van or container provided with a dehumidifying device according to the present invention.

In FIG. 1, there is illustrated a portion of the interior of a container or van 10, in which cargo or other material to be contained during transportation may be placed. The container 10 comprises an outer skin 12 of metal or the like, and a plurality of strategically placed stiffening ribs 14 which serve to provide strength and to maintain the shape of the container.

A dehumidifying device 16 is nested between adjacent stiffening ribs 14 and is mounted on a support bracket 18 to lie against the inner surface of the skin 12 of the container. It will be noted that the dehumidifying device 16 is relatively compact and does not project out into the conainer interior to any appreciable degree.

Actually, the thickness of the dehumidifying device 16 may be less than that of the stiffening ribs 14, so that it does not interfere with the available cargo space within the container.

The dehumidifying device 16 which may be of rectangular configuration, is provided with an outer cover 20 and a handle 22 which can be easily transferred from one container to another when conditions demand.

The outer cover 20 has a front wall 21 and this is provided with a rectangularly shaped air inlet opening 22. A screen 23 extends across the opening 22. A dry air outlet opening 24 is provided in a side wall 25 of the device. A reactivation outlet duct 26 extends out from another side wall 27. The duct 26, as shown, extends through the skin 12 of the container 10 and communicates with the exterior of the container for the ejection of a reactivation air. A replacement air inlet opening 30 is also provided in the outer skin 12 of the container 10 to admit outside air to make up for the ejected reactivation air.

In operation of the device as thus far described, air within the container 10 which is to be treated, passes through the air inlet opening 22 into the dehumidifying device 16 and is dried therein. The dried air passes out through the dry air outlet opening 24 back into the container 10. At the same time, a small portion of the air which was drawn in through the air inlet opening 22, is used to absorb the moisture taken from the remainder of the air passing through the dehumidifying device 16; and in doing so this small portion becomes heavily laden with moisture. It is this small, heavily moisture laden portion which is directed through the reactivation outlet duct 26 to the outside of the container 10. In order to make up for the loss of this air, additional or makeup air is brought in through the makeup opening 30 in the container 10.

The internal construction of the dehumidifying device 16 is shown in FIGS. 2–5. As can be seen in these figures, there is provided a desiccant wheel 32 which revolves about a central axis 34. The wheel 32 is made up of corrugated paper-like material 36 spirally wound about a central hub 38 which lies along the axis 34. The corrugations of the material 36 extend parallel to the axis 34; and, in the fully formed wheel, they serve to define a plurality of separate parallel passageways 40 extending through the wheel 32. The paper-like material 36 is treated with a hygroscopic substance such as lithium chloride. This substance is capable of extracting moisture from the air passing through the passageways 40 or of giving up moisture to the air depending upon the relative vapor pressures produced by the moisture content in the air and in the substance. Thus, when air of high moisture content passes through the passageways 40, moisture will be extracted from the air and the air will be dried or dehumidified. When, on the other hand, the hygroscopic substance is moisture saturated and warm air is blown through the passageways 40, this warm air will absorb moisture from the hygroscopic substance and reactivate it. The wheel 32 is also provided with a solid outer rim 42.

Figure 2:
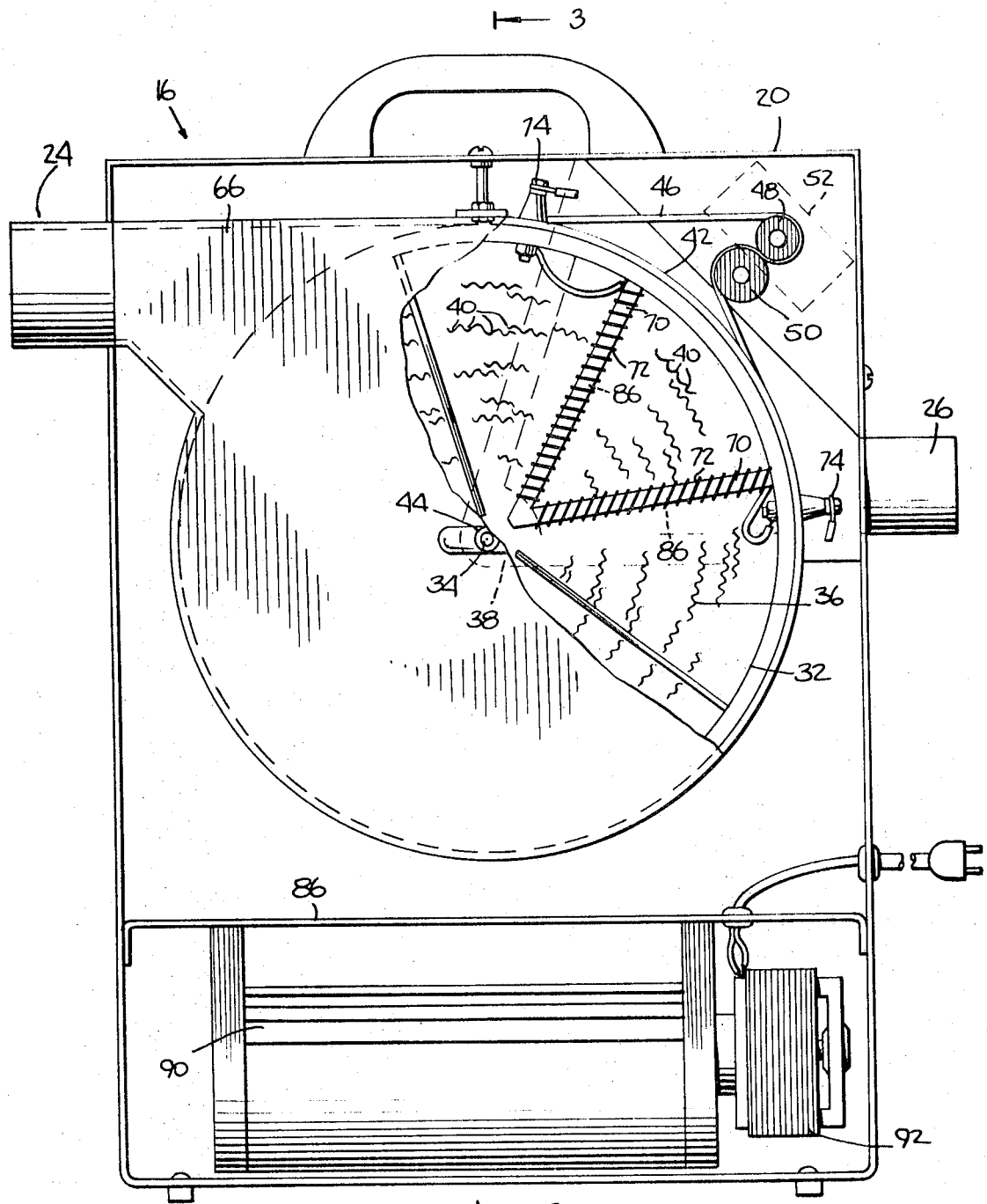
FIG. 2 is a front elevational view, partially cut away, of the dehumidifying device of FIG. 1.

As shown in FIGS. 2 and 3, the wheel 32 is mounted centrally within the outer cover 20 by means of an axle 44 which is fixed to the cover and which passes through the central hub 38 of the wheel. A drive belt 46 extends about the outer rim 42 of the wheel and passes between drive and idler pulleys 48 and 50 inside the outer cover. A wheel drive motor 52 is mounted in the upper portion of the outer cover 20 and is coupled to the drive pulley 48. Operation of the motor 52 thus serves to turn the wheel 32.

Turning now to FIG. 3, it will be seen that the interior of the outer cover 20 is constructed to provide on one side of the wheel 32 an inlet plenum or chamber 54 and a reactivation outlet plenum 56; and on the opposite side of the wheel a process outlet plenum 58 and a heater plenum 60. As can be seen in FIG. 4, the two plenums on each side of the wheel are open to the ends of the wheel passageways 40 over different rotational sectors about the wheel axis 34. Thus, as the wheel 32 rotates, the wheel passageways 40 are brought to different positions such that one end of each passageway opens alternately to the inlet plenum 54 and the reactivation outlet plenum 56, and the other end of each passageway opens alternately to the process outlet plenum 58 and the heater plenum 60.

The angular sector occupied by the heater plenum 60 is larger than and encompasses the sector occupied by the reactivation outlet plenum 56. The significance of this positional relationship will be explained more fully in connection with the description of operation of the device.

The process outlet plenum 58 and the heater plenum 60, as shown in FIGS. 2 and 4, occupy a common housing 62 of hollow disk-like configuration. The interior of the housing 62 is divided by means of radially extending walls 64 into the process outlet plenum 58 and the heater plenum 60. The housing 62 has its edge formed with a dry air duct 66 leading out from the process outlet plenum 58 to the dry air outlet opening 24. A circular opening 68 is formed in one side of the housing 62. This opening extends over the process outlet plenum 58 and the heater plenum 60; and it provides communication between the wheel passageways 40 and these two plenums.

A pair of heater support rods 70 extend in radial directions inside the housing 62. Electrical heater wires 72 are coiled about the rods 70. These wires are connected together in series and are brought out to terminals 74 (FIG. 2) in the outer edge of the housing 62. Electrical wiring (not shown) is provided to supply electrical power from an input cord 76 to the terminals 74 and the heater wires 72.

The reactivation outlet plenum 56, as shown in FIG. 4, is formed within a sector shaped reactivation housing 78. The housing 78 is mounted inside the outer cover 20 against an outer housing wall 80. The reactivation housing 78 is provided with a sector shaped opening 82 which communicates directly with one end of different ones of the wheel passageways 40 as the wheel 32 rotates. The reactivation outlet duct 26, which leads to the exterior of the device 16, communicates with the interior of the reactivation outlet plenum 56.

The reactivation housing 78 is provided with a pair of radially extending walls 86 which define the sectoral extent of the reactivation outlet plenum 56. As can be seen in FIGS. 2 and 4, the walls 86 are aligned with the heater support rods 70 on the opposite side of the wheel 32.

The axle 44 on which the wheel 32 rotates is secured to the reactivation housing 78 which supports the axle in proper position within the outer cover 20.

The inlet plenum 54 is formed by the portions of the interior of the outer cover 20 not occupied by the other plenums 56, 58 and 60. As can be seen in FIGS. 3 and 4, the inlet plenum 54 is thus in direct communication with one end of those wheel passageways 40 on the reactivation outlet plenum side of the wheel which are not aligned with the reactivation outlet plenum. Thus, as the wheel 32 rotates, the ends of the wheel passageways 40 communicate alternately with the inlet plenum 54 and the reactivation outlet plenum 56.

Just below the wheel 32 inside the outer cover 20, there is provided a horizontal wall 86. This wall is formed with an opening 88 leading to the inlet plenum 54. A blower 90 is mounted below the horizontal wall 86 and is arranged to pull air in through the inlet opening 22 and to force this air up through the horizontal wall opening 88 and into the inlet plenum 54. The blower 90 is driven by an electric motor 92, which also is mounted under the horizontal wall 86. The motor 92 receives electrical power via the input cord 76.

The operation of the above-described dehumidifying device 16 will be discussed in conjunction with FIGS. 5 and 6. As there shown, air to be dehumidified, which is represented by arrows 94, is blown through the inlet plenum 54 toward one side of the wheel 32 in an axial direction. This air passes through those wheel passageways 40 which are aligned with the inlet plenum 54, and during this passage, the air loses moisture to the hydroscopic substance in the wheel passageways. Upon emerging from the wheel passageways 40, a greater portion of the thus dried air, indicated by arrows 96, moves through the process outlet plenum 58 and passes out through the dry air outlet opening 24.

It will be noted, as previously mentioned, that the rotational sector occupied by the heater plenum 60 extends over and encompasses the reactivation outlet plenum 56. Thus, some of those wheel passageways 40 which are open to the inlet plenum 54 on one side of the wheel 32 are also open to the heater plenum 60 on the other side of the wheel. The portion of the dried air which passes these particular wheel passageways, enters the heater plenum 60, as indicated by arrows 98. This air enters the heater plenum on the outside of the sector defined by the heater support rods 70. This air passes over the heater wires 72 and into the sector between them. From there it passes back through the wheel passageways 40 which happen to be aligned with the reactivation outlet plenum 56. During this passage, the dried and heated air extracts moisture from the wheel passageways through which it passes; and it carries this moisture out of the device 16 via the reactivation outlet plenum 56. This reactivates the hydroscopic substance in those passageways and enables it subsequently to absorb further moisture.

As indicaed above, the wheel 32 rotates continuously during the above-described air movement so that each of the air passageways 40 are successively brought into alignment with the different plenums 54, 56, 58 and 60. Thus, during operation of the device each air passageway 40 at one time serves to dry the air which is passing through it and at another time it becomes reactivated by the air passing through it.

The construction of the device illustrated in FIGS. 1–6 is quite simple and inexpensive; and the ducting is minimized by the arrangements employed. Thus, no special manifolds or ducts are necessary to separate the portion of the dried air to be used for reactivation of the wheel passageways; and no special ducts are needed to direct this air back through these passageways. The system allows for very simple heater arrangements and eliminates the need for a special heater unit and associated ducting. As shown in FIGS. 5 and 6, makeup air, indicated at 100, joins the incoming air 94 in the inlet plenum 54 to replace the moisture laden air 98 which was ejected from the reactivation outlet plenum 56. It will be appreciated that the amount of air needed for this purpose is small relative to the total amount of air processed. Thus, the system, by continually recirculating and reprocessing the air within the container 10, can operate to reduce its humidity to a very low value. The system moreover is relatively unaffected by external ambient conditions since only a minor amount of makeup air is required.

A modification of the above-described system is illustrated in FIGS. 7 and 8. According to this modification, the moisture laden air 98, which passes out from the reactivation outlet plenum 56, is cooled and its moisture is extracted by condensation and is thereafter collected in liquid form. Following this extraction, this air is then redirected back into the system for further processing.

As shown in FIG. 7, there is provided under the device 16, a refrigeration unit 102 of conventional construction. The refrigeration unit has internal ducting 104 (FIG. 8). As shown, the reactivation air outlet duct 26, instead of passing out through the wall of the container, communicates directly with the internal ducting 104 of the refrigeration unit 102. Refrigeration coils 108 from the refrigeration unit 102 are arranged in heat exchange relationship with the ducting 104 and these serve to cool the air passing therethrough. This cooling action condenses the concentrated moisture in the air, and this moisture passes in liquid form through a liquid collection pipe 110 and is accumulated in a flexible bag 112 or other closed container tightly connected to the pipe 100.

The air output from the ducting 104 is connected via a return pipe 114 to the air inlet opening 22.

It will be appreciated that with the arrangement of FIGS. 7 and 8, a compact yet completely self-contained dehumidifying system is provided. No external connections, save for electrical power, are required. Thus, the air within the container 10 may be controlled in humidity completely independently of the outside conditions.

FIGS. 9-12 show a still further embodiment of the present invention wherein a number of special advantages are attained. As shown in FIG. 9 there is provided a stationary base plate 120 onto which is fastened an inverted container-like cover 122. The cover 122 is of generally cylindrical configuration and is formed with an integral cover plate 124 at its upper end. The lower end of the cover 122 is formed with an outwardly directed flange 126 which is secured to the base plate 120 by means of bolts 128. A gasket or seal (not shown) may be interposed between the flange 126 and the plate 120 to prevent leakage when the system is used to devaporize gases which are not at atmospheric pressure.

A desiccant wheel 130 is arranged coaxially within the cover 122 and is mounted to rotate on a shaft 132 which extends up through the base plate 120. A drive motor 134 is arranged below the base plate 120 to turn the shaft 132 and thus rotate the wheel 130 during operation of the device.

The desiccant wheel 130 is of similar construction to the wheel 32 of the previously described embodiments; and as such, it comprises a plurality of closely spaced gas passageways 136 which extend upwardly parallel to the axis of rotation of the wheel. These gas passageways are provided with a hygroscopic substance such as lithium chloride. This substance serves, during gas devaporization, to absorb vapor from the relatively cool gases passing through the passageways 136. Thereafter, when it is reactivated, the hygroscopic substance gives up vapors to the relatively hot gases passing through the passageways 136.

As can best be seen in FIG. 10, there is provided within the cover 122 at the lower end of the desiccant wheel 130, a stationary lower plenum chamber construction 138. This construction comprises a circular bottom plate 140 and central and peripheral upright circular walls 142 and 144. The central wall 142 accommodates the shaft 132 on which the wheel 130 is mounted. The peripheral wall 144 is coextensive with the outer periphery of the wheel 130. A plurality of radial walls 146 extend between the circular walls 142 and 144 and divide the interior of the lower plenum chamber construction 138 into an input plenum 148, a heat recovery return plenum 150, and a reactivation outlet plenum 152.

As can be seen in FIG. 11, the bottom plate 140 is formed with openings 154, 156 and 158 which communicate respectively with the inlet plenum 148, the heat recovery plenum 150 and the reactivation outlet plenum 152. A process inlet conduit 160 (FIG. 9) extends up through the base plate 120 and communicates via the opening 154 with the inlet plenum 148. Similarly, a reactivation outlet conduit 162 extends up through the base plate 120 and communicates via the opening 158 with the reactivation outlet plenum 152. The remaining opening 156, from the heat recovery return plenum 150 merely opens into the interior of the cover 122.

Reverting to FIG. 10, it will be seen that there is provided within the cover 122 at the upper end of the desiccant wheel 130, a stationary upper plenum chamber construction 162 comprising a sectorial top plate 164, a shaft cap 166 at the apex of the top plate, a pair of radial walls 168 along the straight edges of the top plate and a curved peripheral wall 170 along the curved edge of the top plate. The upper end of the shaft 132 is supported in the shaft cap 166 which acts as a bearing. The upper plenum construction 162 itself is supported via a curved sheet metal column 172 which extends up from the base plate 120 and merges with the peripheral wall 170. The column 172 follows the generally cylindrical outer contour of the wheel 130; and because of its curved configuration, its column strength and resistance to bending is greatly enhanced.

The top plate 164, the radial walls 168 and the curved peripheral wall 170 cooperate to define a heater plenum 174 at the upper end of the wheel 130. An electrical heater 176 extends radially inside the heater plenum 174 and operates in similar fashion to the heater in the preceding embodiments.

The region outside the heater plenum 174 at the upper end of the wheel 130 is formed by the cover 122 into a process outlet plenum 178. As can be seen in FIG. 12, the outer cover 122 is of significantly larger diameter than the diameter of the wheel 132. This arrangement serves to define an annular space 180 which communicates between the process outlet plenum 178 and an outlet region 182 near the bottom of the device. An outlet conduit 184 communicates via the base plate 120 to the outlet region 182 and permits devaporized gases to be carried away from the system. A small portion of the gases in the outlet region 182, however, pass up through the opening 156 to the heat recovery return plenum 150.

It will be appreciated that the gas passageways 136 of the wheel 130 open at the top and bottom ends of the wheel respectively directly into the various described plenums.

In operation of the embodiment of FIGS. 9-12, gas to be devaporized enters via the process inlet conduit 160 and through the opening 154 into the inlet plenum 148. This gas passes upwardly through a first group of the gas passageways 136 in the wheel 130 to the process outlet plenum 178. During this passage, the gases are devaporized as vapor is transferred from them to the absorptive substance in the passageways. The devaporized gases then pass down through the annular space 180 to the outlet region 182. A major portion of these devaporized gases are drawn out through the outlet conduit 184 for utilization and they pass upwardly through a second group of the opening 156 into the heat recovery return plenum 156, and they pass upwardly through a second group of the gas passageways and into the heater plenum 174. Inside the heater plenum 174, the gases are heated as they pass over the heater 176. They are then redirected downwardly through a third group of the gas passageways 136 into the reactivation outlet plenum 152, and from there they leave the system via the reactivation outlet conduit 162.

It will be appreciated that the arrangement of the various plenums is such that the gas passageways 136 which communicate at their lower ends with the inlet plenum 148 all communicate at their upper ends with the process outlet plenum 178; while the passageways 136 which communicate at their upper end with the heater plenum 174 communicate at their lower ends in part with the heat recovery return plenum 156 and in further part with the reactivation outlet plenum 152. Moreover, as indicated by the arrow A in FIG. 11, the wheel 130 is rotated such that the lower ends of the gas passageways become shifted so that they pass successively from the inlet plenum 148, to the reactivation outlet plenum 152, to the heat recovery return plenum 156 and back to the inlet plenum 148. The significance of this arrangement is that it permits the gases which are to be used for reactivation purposes to pass up through the freshly reactivated but still quite warm gas passageways. This passage of relatively cool dry gas serves to cool the gas passageways so that they will be enabled to absorb vapors as they move into position over the inlet plenum 148. At the same time, the heat obtained by the dry gases passing up through the freshly reactivated gas passageways, raises the temperature of these gases so that less heat is required in the heater plenum to bring the gases up to reactivation temperature. It will be appreciated that in this manner the overall efficiency and effectiveness of the system is significantly increased.

It will further be appreciated that the above-described mechanical construction is especially suited to low-cost production and long-term, low maintenance operation. As can be seen in FIGS. 9 and 10, only a single bearing seal is required. Moreover, the cover 122, which is of economical construction is simple to remove; and once removed it exposes the entire system for easy maintenance.

In the event that an entirely closed loop system is desired, a condenser 190 as shown in FIG. 9, may be provided in the reactivation outlet conduit 162 to liquify and separate the vapors extracted in reactivating the wheel 130. The outlet conduit 162 in such case can be redirected, as shown in FIG. 9, to a venturi 192 or similar aspirating device which will reinject these gases into the process inlet conduit 160 along with new gases to be demoisturized.

Figure 13:
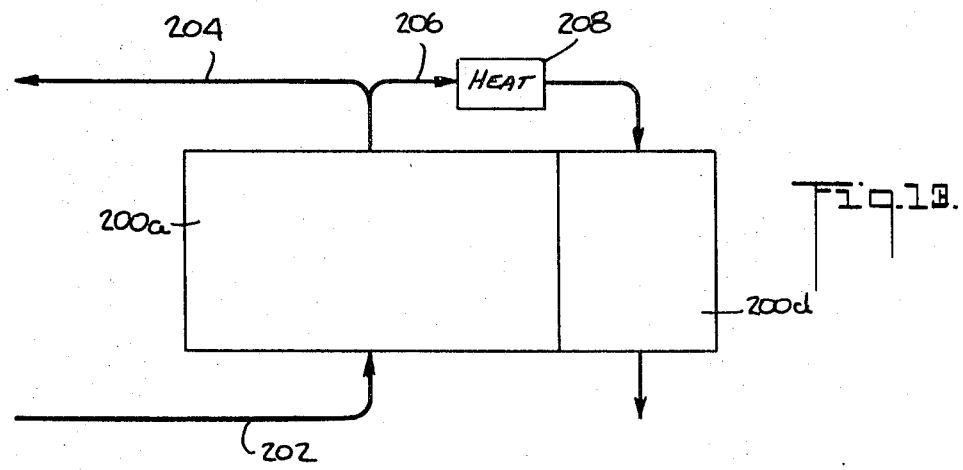
FIGS. 13–15 are schematic diagrams illustrating various gas flow arrangements in systems according to the present invention.
Figure 14:
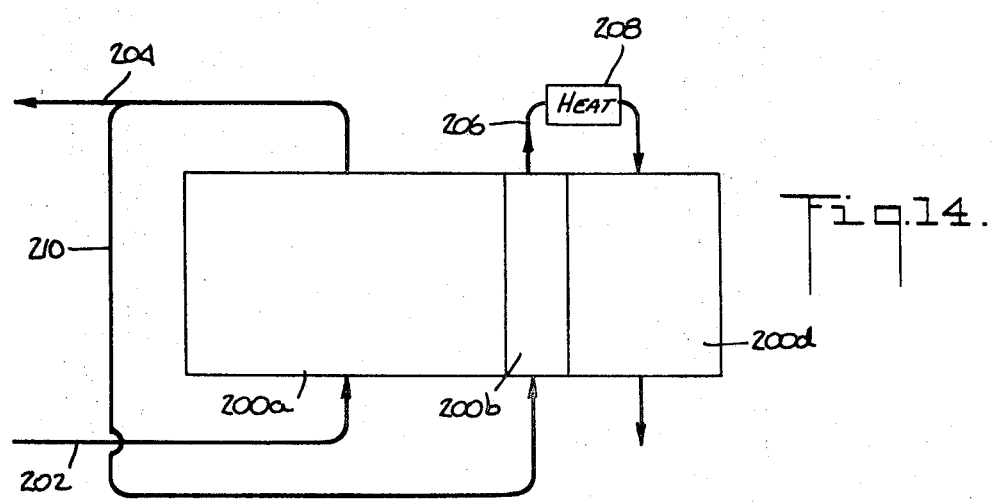
Figure 15:
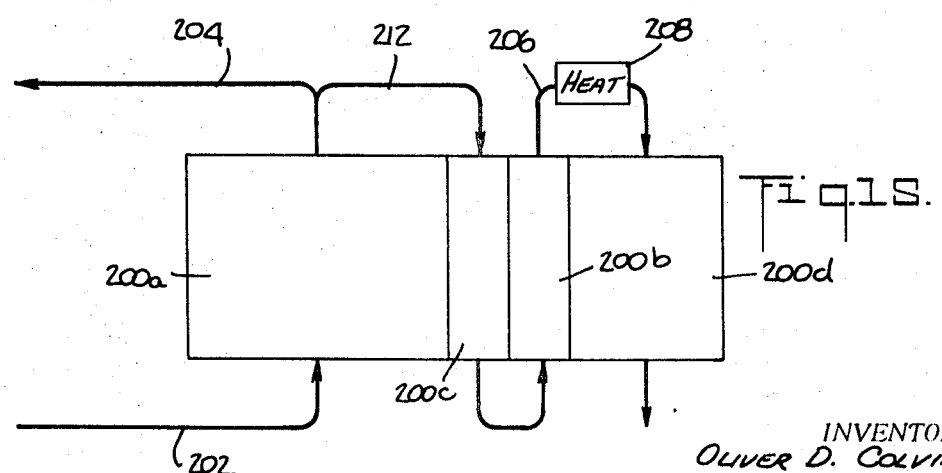

FIGS. 13, 14 and 15 illustrate schematically three variations of the present invention utilizing three different gas flow arrangements. In each of these figures there is indicated a desiccant wheel 200 which has passageways (not shown) extending vertically. These gas passageways are slowly shifted laterally during operation of the device between a gas drying zone 200a (FIGS 13, 14 and 15), a heat recovery zone 200b (FIGS 14 and 15), a preliminary heat recovery zone 200c (FIG 15) and a reactivation zone 200d (FIGS 13, 14 and 15).

In the system of FIG. 13, gases to be processed enter via an inlet conduit 202 and pass up through the gas drying zone 200a. They then divide between an outlet conduit 204 and a heater conduit 206. The gases in the heater conduit 206 pass through a heater 208 and back down through the reactivation zone 200d.

In the system of FIG. 14 the gases to be processed enter via an inlet conduit 202 and pass up through the gas drying zone 200a. They then divide between an outlet conduit 204 and a heat recovery conduit 210. The gases in the heat recovery conduit 210 pass around the system and up through the heat recovery zone 200b. They then pass through a heater 208 and back down through the reactivation zone 200d.

In the system of FIG. 15 the gases to be processed enter via an inlet conduit 202 and pass up through the gas dry- 204 and a preliminary heat recovery conduit 212. The gases in the preliminary heat recovery conduit 212 pass down through the preliminary heat recovery zone 200c and back up through the heat recovery zone 200b. They then pass through a heater 208 and back down through the reactivation zone 200d.

The system of FIG. 13 utilizes the gas flow pattern of the arrangements of FIGS. 1–8 while the system of FIG. 14 utilizes the gas flow pattern of FIGS. 9–12. The system of FIG. 15 is similar to that of FIG. 14 but instead of using a reactivation gas flow path which extends about the wheel it incorporates a reactivation gas flow path which utilizes an additional sector of the wheel wherein the gases pass successively down and back up through the wheel to obtain the desired heat recovery.

FIGS. 16–22 show a further embodiment of the present invention, such embodiment being particularly adapted for use in cargo containers where a minimum amount of space is available for wall openings to admit and exhaust air between the container interior and the atmosphere. As shown in FIG. 16, there is provided a generally rectangularly-shaped cargo container 250 within which is mounted a dehumidification unit 252. The dehumidification unit 252 is mounted adjacent one wall 254 on the inside surface thereof. A canopy-like rain shield 256 extends a short distance outwardly on the exterior side of the wall 254. As shown in FIG. 17, the wall 254 is penetrated inside the rain shield 256 by a pair of adjacent circular segments 258. A small circular opening 260 is located between the segments 258. A pipe-like extension 262 protrudes out from the circular opening 260 and bends downwardly to protrude out from below the rain shield 256 (FIG. 16). The segments 258, as will be seen more fully hereinafter, are used for admission of replacement air into the system while the circular opening 260 and the pipe extension 262 leading therefrom provides for exhaustion of regeneration air.

The internal construction of the dehumidification apparatus 252 is illustrated in the cutaway section views of FIGS. 18 and 19. As shown in those views, the dehumidifier apparatus 252 is enclosed within a generally rectangularly-shaped outer housing 264. The housing itself, as shown in FIG. 19, is fastened by means of bolts 266, or the like, to the container wall 254. A desiccant wheel 268 is mounted for rotation in a plane parallel to and displaced a short distance from the container wall 254. The wheel 268 is of similar construction to the wheel 42 shown and described in connection with FIG. 3; and as such it is made up of a plurality of closely spaced axially extending openings lined with a desiccant material for absorbing moisture from gases passing through them. Motor means (not shown) are provided to rotate the wheel 268 about its axis.

Within the outer housing 264, there is provided a reactivation outlet chamber 270. This chamber is formed by an upper arcuate-shaped partition 272 and a pair of radially extending side partitions 274. The partitions 272 and 274 extend from the desiccant wheel 268 to a back wall 276 of the outer housing 264 which lies against the container wall 254. The pipe extension 262 communicates through the container wall 254 and the back wall 276 with the reactivation outlet chamber 270.

The two radially extending partitions 274 merge in the vicinity of the center of the desiccant wheel 268 and combine to form a common downwardly extending partition segment 278 which, as can be seen in FIG. 18, extends to the bottom of the segments 258. A pair of branch partitions 280 extend from the lower end of the partition segments 278, downwardly at an angle, as shown in FIG. 18, and merge with a horizontally extending fan compartment wall 282. As can be seen in FIG. 19, the downwardly extending partition segment 278 and the branch partitions 280 abut against the back wall 276 of the dehumidifier housing 264; but they do not extend back as far as the desiccant wheel 268. A central divider wall 284 extends parallel to and between the back wall 276 and the desiccant wheel 268. An upper horizontal partition 288 extends from the upper edge of the divider wall 284 between the divider wall and the back wall 276. This arrangement forms an air inlet chamber 290 on each side of the reactivation outlet chamber 270. Each air inlet chamber 200 is exposed to one of the inlet segments 258.

The region beneath the fan compartment wall 282 is used for air flow control arrangements which will now be described. As shown, a centrally located fan motor 292 is arranged centrally below the fan compartment wall 282. The fan motor 292 is provided with a drive shaft 294 at each end thereof, and these drive shafts serve to turn fan impeller blades 296.

The fan impeller blades 296 are positioned within associated impeller housings 298, and these impeller housings have axial inlets 300 which open into air mixing chambers 302. The impeller housings 298 are also provided with tangential outlets 304 which open into a desiccant wheel supply chamber 306 on the same side of the wheel as and adjacent to the air inlet chambers 290.

The air mixing chambers 302 communicate with the air inlet chamber 290 via an air inlet window 308. The air mixing chambers 302 also communicate with the interior of a cargo container 250 via container air inlet openings 310. The air inlet windows 308 and the container air inlet openings 310 may be selectively closed and opened by means of pivoted damper doors 312 and 314 which are mounted to move in the directions indicated by the arrows A in FIG. 18. The manner in which these doors are operated will be described more fully hereinafter.

A dry air chamber 316 is formed on the side of the desiccant wheel 268 opposite from the reactivation outlet chamber 270 and the air inlet chamber and desiccant wheel supply chambers 290 and 306. The dry air chamber opens out to the interior of the container 250 via a container air supply opening 318 formed in a front wall 320 of the dehumidifier housing 264. A sector of the dry air chamber 316 is separated from the remainder of the chamber by a pair of regeneration air partitions 322. The sector set off by these partitions is somewhat larger than the sector set off by the partitions 274 defining the deactivation outlet chamber 270. However, the two sectors are in alignment. Heater means (not shown) are provided within the sector set off by the regeneration air partitions 322 and this serves to heat a portion of the air passing through the wheel 268 so that it can be returned back through a portion of the wheel for regeneration thereof in the same manner described above in connection with the preceding embodiments.

In operation of the system as thus far described, the desiccant wheel 268 is rotated slowly, as in the preceding embodiments; and the fan motor 292 is operated continuously. The fan serves to draw outside air in through the segments 258 and cause it to pass down through the air inlet chamber 290 and through the air inlet windows 308 to the air mixing chambers 302. This outside air then passes in via the axial inlet 300 of the impeller housing 298 and out through the tangential outlets 304 to the desiccant wheel supply chamber 306. The air is then forced through those of the axial passageways of the desiccant wheel 268, which are not aligned with the reactivation outlet chamber 270. The air in passing through the desiccant wheel 268 becomes dried and this dried air exits into the dry air chamber 316. From there it passes out through the container air supply opening 318 into the interior of the cargo container 250. A portion of the dried air, however, exits between the regeneration air partitions 322 and passes across the not shown heater means where it becomes converted to regeneration air. This regeneration air is then redirected back through the passageway of the desiccant wheel 268 which come into alignment with the reactivation outlet chamber 270. This regeneration air in passing back through the desiccant wheel serves to extract moisture from it and thereby reconditions the desiccant substance within the passageways so that it can continue to absorb moisture. This regeneration air then passes into the reactivation outlet chamber 270 and is exhausted through the pipe extension 262.

As indicated above, the pivoted damper doors 312 and 314 may be operated to selectively control the openings 308 and 310. In normal dehumidification operation, the doors are moved to their dotted line positions, thereby providing maximum openings of the container air inlet openings 310 and minimal opening of the air inlet windows 308. In such a situation, the air being passed through the desiccant wheel 268 consists primarily of air from the interior of the cargo container 250. This permits the humidity within the container to be brought down very rapidly since essentially the same air is continuously reprocessed through the dehumidifier apparatus. However, by selectively adjusting the positions of the pivoted damper doors 312 and 314, the ratio of new container air being processed can be adjusted. By properly controlling this adjustment, new air may be substituted for the air already in the container at any desired rate. Thus, there is provided a combined ventilation and dehumidification arrangement wherein the ventilation can be adjusted over a considerable range. This is especially advantageous because of the fact that different cargoes may require different dehumidification rates and different air exchange rates, and because of the fact that different external atmospheric conditions such as temperature and humidity of the incoming air may also require different air exchange rates.

The manner in which the damper doors 312 and 314 are operated is illustrated in detail in FIGS. 20–22. Reverting briefly, to FIG. 18, however, it wil lbe seen that within the chamber occupied by the fan motor 292, there is provided a door operating mechanism 324 (illustrated in general outline). A pair of drive belts 326 extend from the door operating mechanism 324 toward the damper doors 312 and 314 on the opposite sides of the dehumidification apparatus. Turning now to FIG. 20, it will be seen that the drive belt 326 extends from belt drive pulleys 328 to an associated upper damper door pulley 330. Thus, by turning the belt drive pulleys 328, the associated upper damper door pulleys 330 can be made to turn by a corresponding amount in the same direction and this in turn will cause the upper damper door 312 to swing so that it will selectively close off either the air inlet window 308 (as indicated in phantom outline) or the container air inlet opening 310 (as indicated in solid outline).

The upper damper door pulley 330 is itself driveably connected by means of a lower damper door drive belt 334 to a lower damper door pulley 336, thus providing a drive arrangement which causes the two doors 312 and 314 to move in a synchronized manner whenever the belt drive pulleys 328 are operated.

FIS. 21 and 22 illustrate the manner in which the belt drive pulleys 328 are operated. As can be seen in these figures the two belt drive pulleys 328 are geared together by means of a pair of synchronizing gears 338. A pinion gear 340 is mounted on the same axle as one of the synchronizing gears 338; and this pinion gear 340 is meshed with a reciprocally moveable rack 342. The rack in turn is operated by means of a lever arm 344 and this in turn is actuated by means of a solenoid 346. Thus, when the solenoid 346 is energized, it causes the lever arm 344 to pivot about a central fulcrum 348, thereby causing the rack 342 to move reciprocally in a lengthwise direction. This rotates the pinion gear 340 which in turn causes the synchronizing gears 338 to turn in opposite directions. The synchronizing gears operate their associated drive belt pulleys 328 and this in turn moves the drive belts 326 to cause the upper and lower damper doors 312 and 314 to move as indicated above.

The solenoid 346 and the various other electrical elements in the dehumidification system are interconnected in accordance with the electrical schematic diagram of FIG. 23. As there shown, externally supplied electrical energy is received via a three-phase electrical supply line 350. A single phase transformer 352 is connected across one phase of the supply line 350 to provide energy for the various controls. A triple throw electrical switch 354 connects the input line 350 to the fan motor 292 and to an electrical heater 356. The switch 354 is operated electrically by means of a relay 358. The heater 356, as indicated above, is located between the regeneration air partitions 322 in the dehumidification unit to heat the portion of the dry air which is used for regeneration of the desiccant wheel.

One line from the transformer 352 is connected to one side each of the solenoid 346, the relay 358 and a desiccant wheel drive motor 360. The other line from the single phase transformer 352 is connected to the throw of a double throw double pole switch 362. One lower pole of the switch 362 is connected by means of a bypass line 363, directly to the relay coil 358 and the drive motor 360. The other lower pole is connected to the opposite side of the solenoid 346. One upper pole of the switch 362 is connected, via a humidity sensitive switch 364, also to the opposite side of the relay coil 358 and the drive motor 360. An indicator light 366 is connected across the output of the single phase transformer 352 in order to provide continuous indication of the presence of electrical power for operation of the system.

The electrical system of FIG. 23 controls operation of the dehumidification apparatus in the following manner. When the system is to be used for dehumidification purposes, the switch 360 is through to its upper position, thereby connecting the humidity sensitive switch 364 to the relay coil 356 and the wheel drive motor 360. When the humidity sensitive switch 362 indicates that dehumidification is required, this switch will be closed, thereby allowing current to flow through it to the relay coil 356 and wheel drive motor 360. The relay coil 356 is thus energized and closes the triple throw switch 354, thereby causing the fan motor 292 and the heater 356 to go into operation. At the same time the wheel drive motor 360 will go into operation to turn the desiccant wheel. The system will continue in operation until the humidity sensitive switch 364, upon sensing a low humidity condition, will open to stop all operation.

The system is placed into a ventilating mode of operating by moving the switch 362 to its lower position. In this configuration the circuit supplies current directly to the wheel drive motor 360 and the relay 358, bypassing the humidity sensitive switch 364. At the same time the solenoid 346 is connected across the output of the transformer 352 thereby energizing the solenoid to move the doors 312 and 314 to their solid line positions shown in FIGS. 18 and 20. This serves to prevent container air from entering the dehumidification unit 252 and at the same time it permits full flow of outside air through the desiccant wheel.

In this ventilating mode of operation a small percentage of the air which has passed through the desiccant wheel is heated and returned through its regenerating sector and exhausted via the pipe-like extension 262. The majority of the incoming air however, after being dried in the wheel, passes through the container and is exhausted through a vent opening 368 in the opposite end of the container 250 (see FIG. 16).

Although certain embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A devaporizing device comprising a devaporizing wheel having a plurality of separate air flow passageways containing a devaporizing substance, said passageways being distributed about and passing through said wheel in a direction parallel to its axis, driving means arranged to rotate said wheel about its axis, housing means defining air chambers on opposite sides of said wheel, each housing means comprising outer wall means parallel to and displaced a short distance from the side of said wheel, and surrounding wall means extending from the outer wall to the outer circumference of said wheel, the side of said wheel completing the air chamber, said air chambers being open to the respective ends of each of said air flow passageways, further wall means within each of said air chambers, said further wall means comprising a pair of partition plates extending radially to the surrounding wall and between said outer wall means and said wheel thereby dividing the interior of the housing into major and minor regions each open to said air flow passageways at a different sector of rotation about the axis of said wheel, the sector occupied by the minor region on one side of the wheel fully encompassing the sector occupied by the minor region on the other side of the wheel, means defining an air input opening into the major region on said other side of said wheel, means defining a first air outlet opening from the major region on said one side of the wheel, means defining a second air outlet opening from the minor region on said other side of the wheel, means for blowing air into said inlet opening and out said outlet openings and heater means arranged within the minor region on said one side of said wheel, the air flow passageways within the wheel cooperating with the partitions and wall means to direct the air, which has passed through those passageways extending from the major region on the other side of the wheel to the minor region on the one side of the wheel, across said heater and back through other passageways which extend from the minor region on the one side of the wheel to the minor region on the other side of the wheel.

2. A devaporizing device as in claim 1 wherein said heater means is positioned within the minor region on one side of the wheel along lines corresponding to the edges of the sector occupied by the minor region on the other side of the wheel.

3. A devaporizing device as in claim 1 wherein said heater means comprises electrical resistance elements extending through said minor region on said one side of said wheel.

4. A gas devaporization system capable of drying the air within an enclosure without transfer of air to or from said enclosure, said system comprising a housing, vapor absorption means within said housing, first means for directing air to flow into said housing through a first portion of said vapor absorption means and out from said housing, an air heater, second means extending from said first means downstream of said first portion of said vapor absorption means and arranged to direct a minor amount of the air from said first means through said heater and back through a second portion of said vapor absorption means, an air cooling device, third means extending from said second portion of said vapor absorption means and directing the minor amount of air which has passed through said second portion to flow through said air cooling device, liquid collection means arranged in said third means near said cooling device to collect and retain liquid which condenses from said minor amount of air upon passing through said cooling device, said third means beyond said air cooling device leading into said first means upstream of said first portion of said vapor absorption device, blower means for causing air to flow through each of said ductwork means in the directions stated and means for causing the vapor absorptive material in said vapor absorption device to recirculate among its said regions.

5. A gas devaporization system as in claim 4 wherein said first means for directing air comprises an input plenum positioned adjacent one side of said wheel and open directly to a first rotational sector of said wheel and a process output plenum positioned adjacent the other side of said wheel and open directly to a second rotational sector of said wheel, said second sector overlapping a portion of said first sector.

6. A gas devaporization system as in claim 5 wherein said second means downstream of said first portion includes a heater plenum positioned adjacent said other side of said wheel and open directly to a third rotational sector, one portion of which overlaps another portion of said first sector.

7. A gas devaporization system as in claim 6 wherein said third means extending from said second portion includes a reactivation outlet plenum positioned adjacent said one side of said wheel and open directly to a fourth rotational sector which overlaps another portion of said third rotational sector.

8. A gas devaporization system as in claim 4 wherein said third means further includes an air duct extending from said reactivation outlet plenum through said air cooling device and into said input plenum.

9. A devaporizing device comprising means defining a plurality of closely spaced gas passageways each extending between two surfaces, a vapor absorbing substance arranged in said passageways, wall means defining an inlet plenum and a heater plenum both opening onto one of said surfaces, said wall means comprising a plurality of spaced partitions extending out from said one surface and cover walls displaced from said one surface and extending between said partitions, further wall means defining, a heat recovery return plenum, a reactivation outlet plenum, and a process outlet plenum each opening onto the other of said surfaces, said further wall means also comprising a plurality of spaced partitions extending out from said other surface and cover walls displaced from said other surface and extending between said partitions, said partitions being relatively positioned such that, a first group of the passageways open to both said inlet and process outlet plenums, while a second group of the passageways open to both said inlet and heat recovery return plenums, a third group of the passageways open to both said heat recovery return and said heater plenums, and a fourth group of the passageways open to both said heater plenum and said reactivation outlet plenum, heater means in said heater plenum and means mounting said passageways and said plenums such that said passageways move among said plenums in recirculatory fashion, whereby all of the air which passes through said heater plenum first passes through two groups of passageways.

10. A devaporizing device comprising a wheel mounted for rotation about a given axis, said wheel being formed with a plurality of closely spaced gas passageways extending therethrough parallel to said axis, said passageways being provided with a vapor absorbing substance, first wall means defining fixed input, heat recovery return and reactivation outlet plenums at one end of and exposed directly to the ends of the gas passageways in different sectors of said wheel, second wheel, second wall means defining a fixed process outlet plenum and a fixed heater plenum exposed to the ends of the gas passageways at the opposite end of the wheel, said wall means comprising partitions extending out from the ends of said wheel along radial lines and cover walls displaced from the ends of said wheel and extending between said partitions, said partitions at the opposite ends of said wheel being relatively positioned such that a first group of the gas passageways open to both said inlet and process outlet plenums, while a second group of the gas passageways open to both said heat recovery return plenum and said heater plenum, and a third group of the gas passageways open to both said heater plenum and said reactivation outlet plenum, means for rotating said wheel among said fixed plenums, means for admitting gases to be devaporized to said inlet plenum, means for emitting gases from said outlet plenum, means for emitting gases from said reactivation outlet plenum, heater means in said heater plenum, and means arranged to supply a portion of the gases which have passed through the gas passageways from said inlet plenum to said heat recovery return plenum, whereby all of the gases which pass through said heater plenum first pass through two groups of passageways.

11. A devaporizing device as in claim 10 wherein said process outlet plenum and said means arranged to supply air to said heat recovery return plenum are together formed by an outer casing enveloping said wheel and each of said plenums.

12. A devaporizing device as in claim 11 wherein said outer casing is configured and dimensioned to provide substantial clearance around the periphery of said wheel.

13. A devaporizing device as in claim 11 wherein said heater plenum is supported at one end of a column extending from the end of said outer casing close to the other plenums, and wherein said column is of sheet metal curved to conform generally to the cylindrical shape of said wheel.

14. A dehumidification apparatus for mounting on the inside surface of a container wall, said apparatus comprising an outer housing having a back wall for mounting on said container wall, a desiccant containing wheel having closely packed axially extending passageways containing a desiccant substance, said wheel being arranged for rotation in a plane parallel to and spaced apart from said back wall by a short distance, sector divider partitions extending between said desiccant wheel and said back wall from the wheel axis radially toward its circumference and dividing the space between the wheel and the back wall sectorially into a regeneration air outlet sector and an air admission sector, further divider partitions separating said sectors from each other and from the outside of said housing, said back wall being formed with openings leading to each sector, fan means arranged to direct air through the portion of axially extending passageways which happen to be aligned with said air admission sector in a direction away from said back wall and out from said outer housing, heater means, means for redirecting a portion of the air from said portion of said passageways past said heater means and back through the remaining passageways to said regeneration air outlet sector, said air admission sector being divided, by further wall means extending between and parallel to said desiccant wheel and said back wall, into adjacent regions, each region having associated openings therein and means connecting said fan means to said openings to take in air from the region adjacent said back wall and to blow air into the region adjacent said desiccant wheel.

15. A dehumidification apparatus according to claim 14 wherein said means for connecting said fan means includes an air mixing chamber having a further opening to the interior of said container and adjustable door means for selectively and alternately controlling the effective size of said further opening and the associated opening of the chamber adjacent said container wall.

16. A dehumidification apparatus according to claim 15 wherein said door means includes a door member pivotally mounted to swing between a position covering said further opening and a position covering said associated opening.

17. In combination a cargo container, a dehumidification unit mounted within said container adjacent one wall thereof, said dehumidification unit including a desiccant containing wheel having closely packed axially extending passageways containing a desiccant substance, said wheel being arranged for rotation in a plane parallel to and spaced apart from said one wall of said container by a short distance, sector divider partitions extending between said desiccant wheel and said wall from the wheel axis radially toward its circumference and dividing the space between the wheel and the container wall sectorially into a regeneration air outlet sector and an air admission sector, further divider partitions separating said sectors from each other and from the interior of said container, said container wall being formed with openings leading to each sector, fan means arranged to direct air through the portion of axially extending passageways which happen to be aligned with said air admission sector in a direction away from said container wall and into the interior of said container, a reactivation return plenum comprising a pair of partition walls extending along radial lines out from the side of the wheel which faces internally of the container and a cover wall displaced from the wheel and extending between the partition wall and heater means positioned within the reactivation return plenum, said axially extending passageways within the wheel cooperating with said pair of partition walls to direct air which has passed through the passageways extending between said air admission sector and said reactivation return plenum to pass across said heater and back through other passageways which extend from the reactivation return plenum to the regeneration air outlet sector.

18. The combination of claim 17 wherein the openings in said container wall leading to each sector are closely spaced on opposite sides of said sector divider partitions.

19. The combination of claim 18 wherein the opening to one of said sectors communicates with a pipe-like extension outside said container leading away from the other openings.

20. The combination of claim 19 wherein said pipe-like extension extends downwardly adjacent the outer surface of said container and wherein the other sector openings are protected by a canopy-like rain shield which extends over said pipe-like extension.

21. A dehumidification unit to be mounted within a container adjacent one wall thereof, said dehumidification unit including a desiccant substance, first duct means for guiding incoming air over a first portion of said desiccant substance and into the interior of said container, an air heater, further duct means guiding a portion of the air which has passed over said substance through said air heater and back over a remaining portion of said substance and outside said container, said first duct means including a first opening for receiving air external to said container and a second opening for receiving air from within said container in advance of said first portion of said desiccant substance, door means for alternately covering said first and second openings, door drive means for moving said door means, fan means for driving air through said first and further duct means, desiccant drive means for continuously exchanging said portions of desiccant substance with respect to said first and further duct means, circuit means for supplying electrical power to operate said heater, said fan means, said desiccant drive means and said door drive means, said circuit means including a double throw switch, a humidity sensitive switch connected to one pole of the double pole switch and arranged, upon application of electrical energy thereto, to sense conditions of humidity within said container and to control operation of said fan means, said heater means and said desiccant drive means, a bypass line connected to the other pole of said louble pole switch and arranged, upon application of electrical energy thereto, to operate said fan means, said heater means and said desiccant drive means continuously, and means connecting said door drive means to said double pole switch in a manner such that said door means are driven to cover said second opening upon operation of said double pole switch to apply energization to said bypass line.

References Cited

UNITED STATES PATENTS

| | | | |
|---|---|---|---|
| 1,222,656 | 4/1917 | Moyer | 99—181 |
| 1,584,903 | 5/1926 | Supplee | 99—181 |
| 1,602,500 | 10/1926 | Nuss | 55—181 |
| 2,053,159 | 9/1936 | Miller | 55—390 |
| 2,680,492 | 6/1954 | Kopp | 55—181 |
| 2,992,703 | 7/1961 | Vasan et al. | 55—62 |
| 3,092,477 | 6/1963 | Persson | 55—196 |
| 3,398,510 | 8/1968 | Pennington | 55—390 |

REUBEN FRIEDMAN, Primary Examiner

C. N. HART, Assistant Examiner

U.S. Cl. X.R.

55—390; 99—181

PO-1050
(5/69)

UNITED STATES PATENT OFFICE
CERTIFICATE OF CORRECTION

Patent No. 3,619,987            Dated November 16, 1971

Inventor(s)    Oliver D. Colvin, et al

It is certified that error appears in the above-identified patent and that said Letters Patent are hereby corrected as shown below:

Column 6, line 33, for "indicaed" read --indicated--;

Column 9, line 48, for "dry-" read --drying zone 200a. They then divide between an outlet conduit--; Column 12, line 6, for "willbe" read --will be--; Column 12, line 29, for "FIS" read --FIGS--; Column 14, line 75, for "betwen" read --between--.

Signed and sealed this 25th day of April 1972.

(SEAL)
Attest:

EDWARD M. FLETCHER, JR.
Attesting Officer

ROBERT GOTTSCHALK
Commissioner of Patents